United States Patent
Inoue

(10) Patent No.: US 6,837,307 B2
(45) Date of Patent: Jan. 4, 2005

(54) VEHICLE AIR CONDITIONER WITH DRIVING MECHANISM OF SINGLE HOT WATER VALVE AND PLURAL AIR MIXING DOORS

(75) Inventor: Kazuya Inoue, Kariya (JP)

(73) Assignee: Denso Corporation, Kariya (JP)

( * ) Notice: Subject to any disclaimer, the term of this patent is extended or adjusted under 35 U.S.C. 154(b) by 242 days.

(21) Appl. No.: 10/246,303

(22) Filed: Sep. 18, 2002

(65) Prior Publication Data

US 2003/0051869 A1 Mar. 20, 2003

(30) Foreign Application Priority Data

Sep. 18, 2001 (JP) ........................................ 2001-283610

(51) Int. Cl.[7] ................................................. B60H 1/00
(52) U.S. Cl. .......................... 165/203; 165/42; 165/43; 237/12.3 A; 237/12.3 B
(58) Field of Search ................................ 165/202, 203, 165/42, 43; 237/12.3 A, 12.3 B

(56) References Cited

U.S. PATENT DOCUMENTS

| | | | | |
|---|---|---|---|---|
| 5,957,377 A | * | 9/1999 | Inoue et al. ........... | 237/12.3 B |
| 6,352,208 B1 | * | 3/2002 | Shibata et al. .......... | 237/12.3 A |
| 6,606,877 B2 | * | 8/2003 | Tomita et al. .............. | 165/236 |
| 6,672,085 B1 | * | 1/2004 | Sangwan et al. ............. | 62/133 |
| 6,679,434 B2 | * | 1/2004 | Okumura et al. ...... | 237/12.3 B |
| 6,702,008 B1 | * | 3/2004 | Hibino et al. ............... | 165/202 |

* cited by examiner

*Primary Examiner*—Ljiljana Ciric
(74) *Attorney, Agent, or Firm*—Harness, Dickey & Pierce, PLC

(57) ABSTRACT

In a vehicle air conditioner, a link mechanism, for connecting one of plural driving devices and one of plural air mixing doors to each other is connected to a hot water valve, and is constructed to be operated to first and second maximum cooling positions. At the first maximum cooling position, the one door connected to the link mechanism is operated to a door maximum cooling position, and the valve is opened. At the second position, the door connected to the link mechanism is operated to the door maximum cooling position, and the valve is closed. Therefore, the valve can be suitably opened and closed in accordance with operation positions of the plural air mixing doors without using a dedicated driving mechanism for the valve.

6 Claims, 3 Drawing Sheets

VEHICLE AIR CONDITIONER WITH DRIVING MECHANISM OF SINGLE HOT WATER VALVE AND PLURAL AIR MIXING DOORS

CROSS-REFERENCE TO RELATED APPLICATION

This application is related to and claims priority from Japanese Patent Application No. 2001-283610 filed on Sep. 18, 2001, the content of which is hereby incorporated by reference.

BACKGROUND OF THE INVENTION

1. Field of the Invention

The present invention relates to a driving mechanism of air mixing doors and a single hot water valve for adjusting a flow amount of hot water flowing into a heater core in an air-mixing type vehicle air conditioner.

2. Description of Related Art

In a conventional vehicle air conditioner, an air mixing system is generally used as an air temperature control method. In the air mixing system, a flow amount ratio of hot air heated by a heater core to cool air bypassing the heater core is adjusted by an air mixing door. Further, in the air mixing system, a hot water valve for adjusting a flow amount of hot water (engine cooling water) flowing into the heater core is not required to control an air blowing temperature, but the hot water valve is provided in many cases for the following reasons.

First, in a maximum cooling, an air passage of the heater core is entirely closed by the air mixing door, and a bypass passage through which air bypasses the heater core is entirely opened by the air mixing door. If the hot water valve is not provided in the air mixing system, high-temperature hot water continues to flow into the heater core even in the maximum cooling. Therefore, air around the heater core is heated by the high-temperature hot water in the heater core, and the heated air is mixed into cool air flowing through the bypass passage due to the natural convection. Thus, the air temperature to be blown into a passenger compartment is increased, thereby reducing the maximum cooling performance. Accordingly, in the maximum cooling, the hot water valve is provided to be entirely closed so that high-temperature hot water is prevented from flowing into the heater core.

Secondly, when the hot water valve is not provided, hot water from an engine continues to flow into the heater core even in the maximum cooling. At this time, since the air passage of the heater core is entirely closed by the air mixing door, the hot water returns to the engine without being cooled. Further, because the hot water flows into the heater core, a flow amount of hot water circulated to a radiator for cooling the hot water is reduced, and engine-cooling performance is reduced. When the hot water flowing into the heater core is stopped by entirely closing the hot water valve in the maximum cooling, the amount of hot water flowing into the radiator is increased, thereby increasing the engine-cooling performance.

In a general vehicle air conditioner including a single air mixing door, the air mixing door is simply coupled to the hot water valve so that the hot water valve is entirely closed when the air mixing door is operated at a maximum cooling position. However, in a vehicle air conditioner including plural air mixing doors, since operational positions (open degrees) of the air mixing doors are independently controlled, it is difficult to operatively link the plural air mixing doors and the single hot water valve. For example, in a right-left independent temperature control system, since the operational positions of the right and left air mixing doors are independently controlled, it is difficult to suitably control the operation of the hot water valve in accordance with the operation positions of the right and left air mixing doors.

On the other hand, if a dedicated driving mechanism only for driving the hot water valve is provided separately from the driving mechanism for the air mixing doors, because the dedicated driving mechanism for the hot water valve needs a servomotor and a link mechanism for opening and closing the hot water valve, production cost of a vehicle air conditioner is increased.

SUMMARY OF THE INVENTION

The present invention has been made in view of the above problem, and its object is to suitably open and close a hot water valve in correspondence to operational positions of plural air mixing doors in a vehicle air conditioner.

Its another object is to suitably open and close the hot water valve using a driving mechanism for one air mixing door among the plural air mixing doors without using a dedicated driving mechanism for the hot water valve.

According to the present invention, a vehicle air conditioner includes an air conditioning case defining a plurality of air passages, a heating heat exchanger for heating air in the air passages, a plurality of air mixing doors disposed in the air passages respectively, a hot water valve for adjusting a flow amount of hot water circulated to the heating heat exchanger, a plurality of driving devices for independently driving the air mixing doors, and a link mechanism. The air mixing doors are for adjusting a flow amount ratio of air heated by the heating heat exchanger to air bypassing the heating heat exchanger in the air passages respectively, and the plurality of driving devices are connected to the plurality of air mixing doors respectively. The link mechanism is for connecting one of the driving devices and one of the air mixing doors, and is connected to the hot water valve. In the vehicle air conditioner, the link mechanism is constructed to be operated to a first maximum cooling position where the one air mixing door connected to the link mechanism is positioned at a door maximum cooling position and the hot water valve is opened, and to be operated to a second maximum cooling position where the one air mixing door connected to the link mechanism is positioned at the door maximum cooling position and the hot water valve is closed. Further, when the one air mixing door connected to the link mechanism is operated to the maximum cooling position and an another air mixing door different from the one air mixing door is operated to a position different from the maximum cooling position, the link mechanism is displaced to the first maximum cooling position. On the other hand, when all the air mixing doors are operated at the door maximum cooling positions, the link mechanism is displaced to the second maximum cooling position.

Accordingly, when the link mechanism is operated to the first maximum cooling position, the one air mixing door connected to the link mechanism is operated to the door maximum cooling position and the hot water valve is opened so that a hot-water flow to the heating heat exchanger can be continued. Thus, a control function of the air temperature can be obtained by adjusting an open degree of an air mixing door not connected to the link mechanism in the air passage where the air mixing door not connected to the link mechanism is provided.

Further, when the link mechanism is set at the second maximum cooling position, the hot water valve is closed while the air mixing door connected to the link mechanism is operated at the door maximum cooling position. Accordingly, when all the air mixing doors are operated at the door maximum cooling positions, the hot-water flow to the heating heat exchanger is stopped by closing the hot water valve. Thus, in the maximum cooling, high-temperature hot water can be prevented from continuously flowing into the heating heat exchanger, and it can prevent air heated by the heating heat exchanger from being mixed into cool air due to the natural convection, thereby improving the maximum cooling performance.

Further, when all the air mixing doors are operated to the door maximum cooling positions, the hot-water flow to the heating heat exchanger can be stopped by closing the hot water valve. Therefore, engine cooling performance can be ensured by increasing an amount of hot water circulated into a radiator at an engine side. Furthermore, the hot water valve can be opened and closed by the link mechanism connected to the one of air mixing doors without using a dedicated driving mechanism for the hot water valve, thereby extremely reducing production cost in the vehicle air conditioner.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to appended drawings. In this embodiment, the present invention is typically applied to a vehicle air conditioner shown in FIG. 1.

Figure 1:
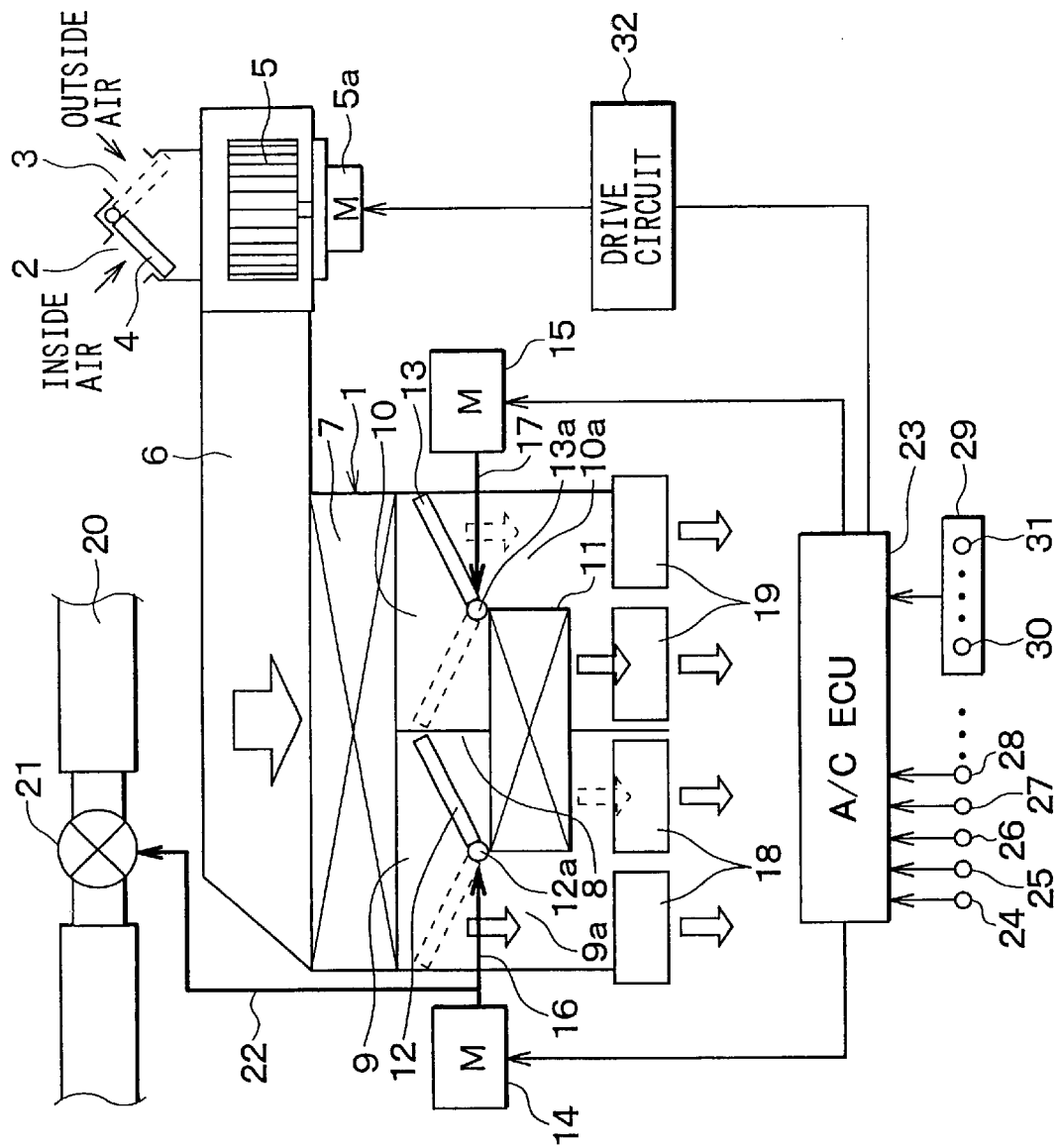
FIG. 1 is a schematic diagram showing an entire structure of a vehicle air conditioner according to a preferred embodiment of the present invention.

In the vehicle air conditioner, as shown in FIG. 1, a ventilation system is constructed so that a temperature of conditioned air to be blown into a space at a driver seat side in a passenger compartment and a temperature of conditioned air to be blown into a space at a front passenger seat side in the passenger compartment can be independently controlled. In FIG. 1, an air conditioning case 1 defines an air passage through which air flows toward a passenger compartment. The air conditioning case 1 includes an inside air suction port 2 and an outside air suction port 3 at its upstream air side. The inside air suction port 2 is for sucking air inside the passenger compartment, and the outside air suction port 3 is for sucking air outside the passenger compartment. The suction ports 2, 3 are selectively opened and closed by an inside-outside air switching door 4 including a plate door disposed rotatably. The inside-outside air switching door 4 is driven by a servomotor (not shown) as a driving device to open and close the suction ports 2, 3.

A centrifugal blower fan 5 is disposed at a downstream air side of the inside-outside switching door 4. The blower fan 5 is driven to be rotated by a blower motor 5a as a driving device. The rotational speed of the blower fan 5, that is, the air blowing amount thereof is controlled by a voltage applied to the blower motor 5a. The downstream air side of the blower fan 5 is connected by a connection duct 6 to an upstream side of an evaporator 7 disposed in the air conditioning case 1. The evaporator 7 constructs a cooling heat exchanger for cooling air by performing heat-exchange between the air and refrigerant in a refrigerant cycle. Specifically, in the evaporator 7, refrigerant absorbs heat from the air so that air passing through the evaporator 7 is cooled. The evaporator 7 also constructs the refrigerant cycle together with a condenser, a decompression device, a compressor driven by an engine (not shown), and the like.

In the air conditioning case 1, a partition plate 8 is disposed in the air passage at a downstream side end of the evaporator 7. Therefore, the air passage at the downstream air side of the evaporator 7 in the air conditioning case 1 is partitioned by the partition plate 8 into a first air passage 9 for the driver seat side and a second air passage 10 for the front passenger seat side. The first air passage 9 is for introducing conditioned air into the space at the driver seat side (left side in FIG. 1) in the passenger compartment, and the second air passage 10 is for introducing conditioned air into a space at the front passenger seat side (right side in FIG. 1) in the passenger compartment. In FIG. 1, the present invention is typically applied to a right steering wheel vehicle. A heater core 11 is disposed at a downstream air side of the evaporator 7. Further, the heater core 11 penetrates through the partition plate 8, and protrudes into the first air passage 9 and the second air passage 10. Hot water (cooling water) from the vehicle engine flows into the heater core 11, so that air passing through the heater core 11 is heated by using the hot water as a heat source.

The first air passage 9 and the second air passage 10 include bypass passages 9a, 10a where air (cool air) flows while bypassing the heater core 11, respectively. Air mixing doors 12, 13 are disposed at upstream air sides of the heater core 11 in the passages 9, 10, respectively. The air mixing doors 12, 13 include plate doors rotatable about rotation shafts 12a, 13a, respectively. The air mixing doors 12, 13 are for adjusting flow amount ratios between air flowing through the heater core 11 and air flowing through the bypass passages 9a, 10a in the passages 9, 10, respectively. Therefore, the temperature of conditioned air blown into the passenger compartment from the first air passage 9 and the temperature of conditioned air blown into the passenger compartment from the second air passage 10 can be independently controlled. Dedicated servomotors 14, 15 as driving devices are connected to the rotation shafts 12a, 13a of the air mixing doors 12, 13 through link mechanisms 16, 17, respectively. The air mixing doors 12, 13 are independently driven by the dedicated servomotors 14, 15, respectively.

In each of the first and second air passages 9, 10, hot air passing through the heater core 11 and cool air passing through the bypass passage 9a, 10a are mixed at the downstream air side of the heater core 11. The mixed air (conditioned air) in the first air passage 9 is blown toward the drive seat side of the passenger compartment through a driver seat opening portion 18, and the mixed air (conditioned air) in the second air passage 10 is blown toward the front passenger seat side of the passenger compartment through a front passenger seat opening portion 19 of the air conditioning case 1. Each of the opening portions 18, 19 includes a defroster opening, a face opening and a foot opening, and the openings are selectively opened and closed by a blow mode door (not shown). The defroster opening is for blowing conditioned air toward a windshield of the passenger compartment. The face opening is for blowing conditioned air toward the upper half body of a passenger in the passenger compartment, and the foot opening is for blowing conditioned air toward the foot side of the passenger in the passenger compartment.

A hot water valve 21 is disposed in a hot water pipe 20 at an inlet side of the heater core 11. Hot water flows into the heater core 11 from the vehicle engine through the hot water pipe 20. The hot water valve 21 is for adjusting an amount of hot water flowing into the heater core 11. A valve body (not shown) of the hot water valve 21 is connected to a link mechanism 22. In this embodiment, the link mechanism 22 is operatively connected to the link mechanism 16 of the servomotor 14 of the driver-seat air mixing door 12. Therefore, the valve body of the hot water valve 21 is driven to be opened and closed by the servomotor 14 through the link mechanisms 16, 22.

An air-conditioning control unit 23 (A/C ECU) is for automatically controlling operation of the air conditioner, and has a microcomputer including a central processing unit (CPU), a read only memory (ROM), a random access memory (RAM) and the like. Detection signals are input from sensors to an input side of the air-conditioning control unit 23. The sensors include an inside air temperature sensor 24 for detecting an inside air temperature Tr of the passenger compartment, an outside air temperature sensor 25 for detecting an outside air temperature Tam, a sunlight sensor 26 for detecting an amount of sunlight radiated into the passenger compartment, an evaporator temperature sensor 27 for detecting a temperature (post evaporator temperature) Te of air directly after blown from the evaporator 7, a water temperature sensor 28 for detecting a temperature (hot water temperature) Tw of hot water to flow into the heater core 11, and the like. Further, operational signals are input from an air-conditioning operational panel 29 to the input side of the air-conditioning control unit 23. The air-conditioning operational panel 29 includes operational members such as a driver-seat temperature setting device 30 and a front passenger-seat temperature setting device 31. A driver and a passenger can set their desired temperatures by the driver-seat temperature setting device 30 and the front passenger-seat temperature setting device 31, respectively.

The servomotors 14, 15 of the air mixing doors 12, 13 are electrically connected to an output side of the air-conditioning control unit 23. The blower motor 5a of the centrifugal blower fan 5 is electrically connected to the output side of the air-conditioning control unit 23 through a driving circuit 32. A servomotor (not shown) for driving the blow mode door and a servomotor (not shown) for driving the inside-outside air switching door 4 are also electrically connected to the output side of the air-conditioning control unit 23.

Figure 2:
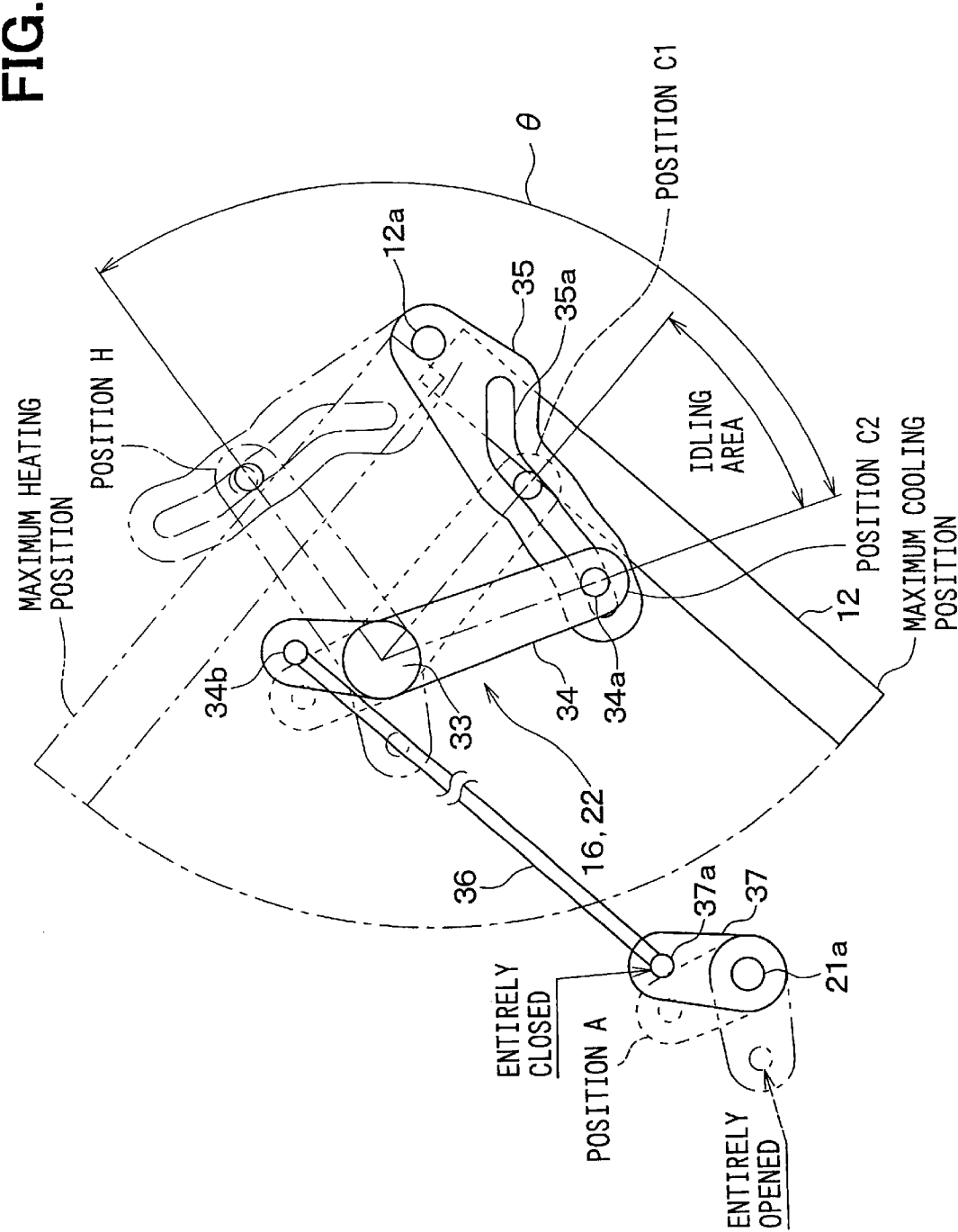
FIG. 2 is a schematic diagram showing link mechanisms according to the embodiment.

An example of the link mechanisms 16, 22 of the servomotor 14 for driving the drive-seat air mixing door 12 is shown in FIG. 2. In FIG. 2, an output shaft 33 of the servomotor 14 is integrated to a bent portion of a driving lever 34 bent in a V-shape. A pin 34a is integrated to one end of the driving lever 34. Further, the pin 34a is fitted into an engagement slot 35a provided in a driven door lever 35 to be slidable in the engagement slot 35a. One end of the driven door lever 35 is integrated to the rotation shaft 12a of the air mixing door 12, so that the rotation shaft 12a and the driven door lever 35 are integrally rotated. A pin 34b is integrated to the other end of the driving lever 34, and is connected to one end of a connection wire 36. The other end of the connection wire 36 is connected to a driven valve lever 37. Specifically, a pin 37a is integrated to one end of the driven valve lever 37, and is connected to the other end of the connection wire 36. The other end of the driven valve lever 37 is integrated to the rotation shaft 21a of the hot water valve 21, so that the rotation shaft 21a and the driven valve lever 37 are integrally rotated.

That is, the link mechanism 16 shown in FIG. 1 is constructed by both levers 34, 35, and the link mechanism 22 shown in FIG. 1 is constructed by the connection wire 36 and the driven valve lever 37. Here, when the hot water valve 21 is disposed near the air mixing door 12, a distance between the output shaft 33 of the servomotor 14 and the rotation shaft 21a of the hot water valve 21 can be reduced. Therefore, in this case, a connection member such as a short connection rod can be used in place of the connection wire 36.

Next, operation of the vehicle air conditioner according to the above-described embodiment will be described. At first, temperature set signals Tset(Dr), Tset(Pa) are input from the temperature setting devices 30, 31 to the air-conditioning control unit 23. Further, detection signals are input from the inside air temperature sensor 24, the outside air temperature sensor 25, the sunlight sensor 26, the evaporator air temperature sensor 27 and the water temperature sensor 28 to the air-conditioning control unit 23. A target air temperature TAO (Dr) for the driver seat side and a target air temperature TAO (Pa) for the front passenger seat side are calculated based on the input signals. The target air temperature TAO (Dr) is a target temperature of air blown to the driver seat side in the passenger compartment, and the target air temperature TAO (Pa) is a target temperature of air blown to the front passenger seat side in the passenger compartment. Then, a target open degree SW (Dr) of the driver-seat air mixing door 12 and a target open degree SW (Pa) of the front passenger-seat air mixing door 13 are calculated based on the target air temperatures TAO (Dr), TAO (Pa), the post evaporator temperature Te, and the water temperature Tw.

Then, operation angles of the servomotors 14, 15 are controlled based on output signals of the air-conditioning control unit 23, so that actual open degrees of the air mixing doors 12, 13 are controlled to correspond to the target open degrees SW (Dr), SW (Pa), respectively. Thus, the air temperature from the opening portion 18 in the first air passage 9 and the air temperature from the opening portion 19 of the second air passage 10 in the air conditioning case 1 can be controlled at the target air temperatures TAO (Dr), TAO (Pa), respectively. Accordingly, the air temperature for the driver seat side and the air temperature for the front passenger seat side can be automatically maintained at the driver-seat set temperature Tset (Dr) and the front passenger-seat set temperature Tset (Pa), respectively. Here, each open degree of the air mixing doors 12, 13 is calculated as a percentage of 0% at the maximum cooling position and 100% at the maximum heating position. At the maximum cooling positions of the air mixing doors 12, 13, the air passages of the heater core 11 are entirely closed, and the bypass passages 9a, 10a of the heater core 11 are entirely opened, respectively. On the contrary, at the maximum heating positions of the air mixing doors 12, 13, the air passages of the heater core 11 are entirely opened, and the bypass passages 9a, 10a are entirely closed, respectively. In FIG. 1, the maximum cooling position of the air mixing door 12 is indicated by the solid line, and the maximum cooling position of the air mixing door 13 is indicated by the broken line. Further, the maximum heating position of the air mixing door 12 is indicated by the broken line, and the maximum heating position of the air mixing door 13 is indicated by the solid line.

Figure 3:
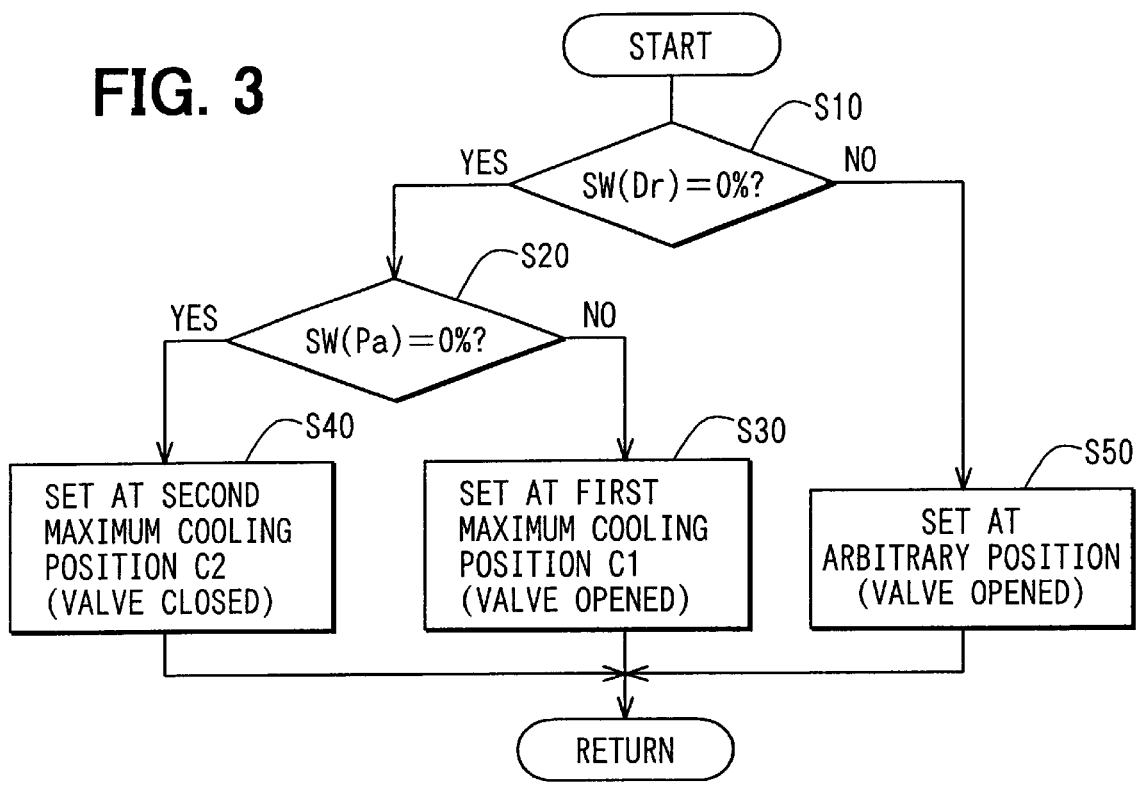
FIG. 3 is a flow diagram showing control operation of the link mechanisms according to the embodiment.

Next, coupled operation of the driver-seat air mixing door 12 and the hot water valve 21 will be specifically described. As shown in FIG. 3, at step S10, it is determined whether the target open degree SW (Dr) is set at 0% (maximum cooling position). When the target open degree SW (Dr) is set at 0%, it is determined whether the target open degree SW (Pa) is set at 0% at step S20. When the target open degree SW (Pa) is not set at 0%, that is, when the target open degree SW (Pa) is determined to be set at a predetermined intermediate open degree (i.e., open degree in a temperature control area), the operational position of the driving lever 34 of the link mechanisms 16, 22 is set at a first maximum cooling position C1 indicated by a broken line in FIG. 2 at step S30. In FIG. 2, by rotating the servomotor 14, the driving lever 34 is rotated about the output shaft 33 in an entire operational angle θ. A second maximum cooling position C2 is located at one end of the entire operational angle θ, and a maximum heating position H is located at the other end of the entire operation angle.

At step S30, the operational position of the servomotor 14 is set so that the driving lever 34 is displaced to the first maximum cooling position C1. Here, the first maximum cooling position C1 is positioned at the side of the maximum heating position H by a predetermined angle, with respect to the second maximum cooling position C2. That is, the first maximum cooling position C1 is positioned between the maximum heating position H and the second maximum cooling position C2, in the entire operation angle θ. When the driving lever 34 is operated at the first cooling position C1, the driven door lever 35 is displaced to the solid line position in FIG. 2 due to the engagement between the pin 34*a* of the driving lever 34 and the engagement slot 35*a* of the driven lever 35. Accordingly, the driver-seat air mixing door 12 is moved to the maximum cooling position indicated by the solid line in FIG. 2. At this time, the driven valve lever 37 of the hot water valve 21 is operated to the broken line position A in FIG. 2 by the driving lever 34 through the connection wire 36, and the hot water valve 21 is opened by a predetermined open degree (corresponding to an open degree α in FIG. 4 described later). Therefore, hot water continues to flow into the heater core 11, thereby accurately performing an air temperature control of the front passenger-seat air mixing door 13 in the second air passage 10.

On the other hand, when the target open degree SW (Pa) is determined to be set at 0% at step S20, that is, when both of the target open degrees SW (Dr), SW (Pa) are set at 0% (maximum cooling position), the operation angle of the servomotor 14 is set so that the driving lever 34 is displaced to the second cooling position C2 at step S40. The second maximum cooling position C2 is separated from the first maximum cooling position C1 by a predetermined angle in a clockwise direction. Here, when the driving lever 34 is displaced from the first maximum cooling position C1 to the second maximum cooling position C2, the pin 34*a* of the driving lever 34 moves in an idling area of the engagement slot 35*a* of the driven door lever 35. Therefore, the driven door lever 35 is not displaced, but is maintained at the solid line position in FIG. 2. Accordingly, the driver-seat air mixing door 12 is maintained at the maximum cooling position indicated by the solid line in FIG. 2. Here, the idling area in the engagement slot 35*a* is formed in an arc shape where the pin 34*a* moves without a movement of the driven door lever 35.

When the driving lever 34 is operated to the second maximum cooling position C2, the driven valve lever 37 of the hot water valve 21 is operated to the solid line position in FIG. 2 through the connection wire 36, and the hot water valve 21 is entirely closed. Therefore, the flow of hot water to the heater core 11 can be stopped, thereby preventing the temperature of cool air in the maximum cooling from being increased by radiation of hot water in the heater core 11 in the first air passage 9 and the second air passage 10. Further, the flow amount of engine cooling water (hot water) to the radiator can be increased by stopping the hot-water flow to the heater core 11, thereby increasing cooling performance of the radiator. Accordingly, it can prevent the vehicle engine from being supper-heated during cooling operation in summer.

On the other hand, when the target open degree SW (Dr) is not set at 0%, that is, when the target open degree SW (Dr) of the driver-seat air mixing door 12 is determined to be set in a predetermined intermediate open degree area (open degree in the temperature control area), the driving lever 34 is operated to an arbitrary position between the first maximum cooling position C1 and the maximum heating position H in FIG. 2 at step S50. That is, the driving lever 34 is operated to an arbitrary position corresponding to the target open degree SW (Dr), thereby controlling the air temperature for the driver seat space by controlling the open degree of the driver-seat air mixing door 12.

Figure 4:
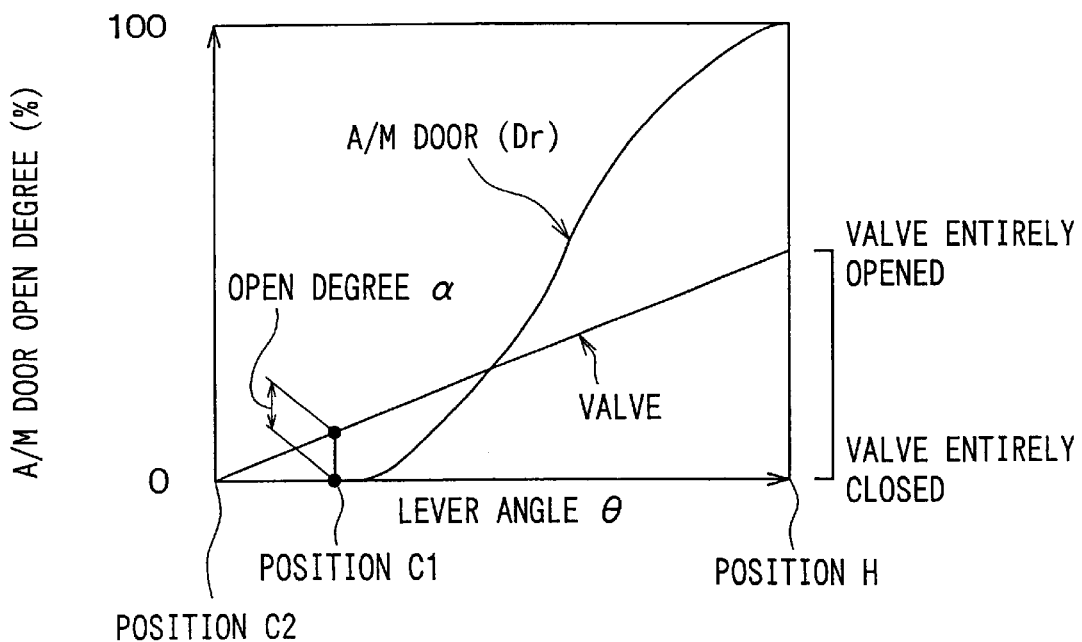
FIG. 4 is a graph showing operation of the link mechanisms according to the embodiment.

FIG. 4 shows changes of open degrees of the driver-seat air mixing door 12 and the hot water valve 21 using the link mechanisms 16, 22. In FIG. 4, the abscissa indicates the operational angle θ of the driving lever 34. When the operational angle θ of the driving lever 34 is set between the first maximum cooling position C1 and the second maximum cooling position C2, the open degree of the driver-seat air mixing door 12 is maintained at 0% (maximum cooling position). At this time, the open degree of the hot water valve 21 is 0% (entirely closed) at the second maximum cooling position C2, but the open degree of the hot water valve 21 is the predetermined open degree α at the first maximum cooling position C1. As shown from FIG. 4, the open degree α of the hot water valve 21 at the first maximum cooling position C1 is set smaller than an open degree when the air passage to the heater core 11 is opened by the driver-seat air mixing door 12. That is, when the operational angle θ of the driving lever 34 is set between the first maximum cooling position C1 and the maximum heating position H, the open degree of the hot water valve 21 is larger than the open degree α of the hot water valve 21 at the first maximum cooling position C1.

Although the present invention has been fully described in connection with the preferred embodiment thereof with reference to the accompanying drawings, it is to be noted that various changes and modifications will become apparent to those skilled in the art.

For example, the present invention can be applied to various air conditioning systems without being limited to the above-described embodiment. In the above-described embodiment, the driver-seat air mixing door 12 is coupled to the hot water valve 21 by the link mechanisms 16, 22. However, the passenger-seat air mixing door 13 may be coupled to the hot water valve 21 by the same link mechanisms as the link mechanisms 16, 22.

Further, the present invention can be applied to a vehicle air conditioner with a front-rear independent temperature control system where an air temperature for a space at a front seat side and an air temperature for a space at a rear seat side of the passenger compartment are independently controlled, without being limited to the right-left independent temperature control system as in the above-described embodiment. Further, the present invention can be applied to a manual control system where the air mixing doors 12, 13 are manually controlled, without being limited to a system where the air mixing doors 12, 13 are driven by a driving device such as a servomotor as in the above-described embodiment. In this case, the link mechanism of the air mixing doors 12, 13 is connected to a manual operation member provided on the air-conditioning operation panel. That is, a driving device for driving the air mixing doors 12, 13 is constructed by a manual operation mechanism.

In the above-described embodiment, the maximum cooling positions of the air mixing doors 12, 13 are set in the states where the bypass passages 9a, 10a are entirely opened and the air passages to the heater core 11 are entirely closed by the air mixing doors 12, 13, respectively. However, the maximum cooling positions may be set in predetermined areas including states where the air passages to the heater core 11 are opened by very small amounts, respectively. Further, the present invention may be applied to a vehicle air conditioner including three ore more air mixing doors without being limited to the two air mixing doors 12, 13 as in the above-described embodiment. The air mixing doors 12, 13 may be another type door such as a film door without being limited to the plate door shown in FIGS. 1, 2.

Such changes and modifications are to be understood as being within the scope of the present invention as defined by the appended claims.

What is claimed is:

1. An air conditioner for a vehicle comprising:
   an air conditioning case defining a plurality of air passages through which air flows into a passenger compartment of the vehicle;
   a heating heat exchanger for heating air in the air passages;
   a plurality of air mixing doors disposed in the air passages, respectively, each of the air mixing doors being for adjusting a flow amount ratio of air heated by the heating heat exchanger to air bypassing the heating heat exchanger;
   a hot water valve for adjusting a flow amount of hot water circulated to the heating heat exchanger;
   a plurality of driving devices connected to the air mixing doors, for independently driving the air mixing doors, respectively; and
   a link mechanism connected to one of the driving devices and one of the air mixing doors, the link mechanism being also connected to the hot water valve, wherein:
   the link mechanism is constructed to be operated to a first maximum cooling position where the one air mixing door connected to the link mechanism is positioned at a door maximum cooling position and the hot water valve is opened, and to be operated to a second maximum cooling position where the one air mixing door connected to the link mechanism is positioned at the door maximum cooling position and the hot water valve is closed;
   when the one air mixing door connected to the link mechanism is operated to the door maximum cooling position and an another air mixing door different from the one air mixing door is operated to a position different from the door maximum cooling position, the link mechanism is displaced to the first maximum cooling position; and
   when all the air mixing doors are operated to the door maximum cooling positions, the link mechanism is displaced to the second maximum cooling position.

2. The air conditioner according to claim 1, wherein:
   the link mechanism includes:
      a driving lever operated by the one driving device,
      a driven door lever connected to the one air mixing door, and
      a driven valve lever connected to the hot water valve;
   the driven door lever and the driven valve lever are displaced by changing an operational angle of the driving lever in an operation angle range;
   the second maximum cooling position is set at one end in the operation angle area of the driving lever, and a maximum heating position where at least the hot water valve is fully opened is set at the other end in the operation angle area of the driving lever; and
   the first maximum cooling position is set between the second maximum cooling position and the maximum heating position in the operation angle area of the driving lever.

3. The air conditioner according to claim 1, wherein:
   the air passages are a first air passage through which air flows toward a drive seat side in the passenger compartment and a second air passage through which air flows toward a front passenger seat side in the passenger compartment;
   the air mixing doors are a first door for adjusting temperature of air blown toward the driver seat side from the first air passage by adjusting the flow amount ratio in the first air passage, and a second door for adjusting temperature of air blown toward the front passenger seat side from the second air passage by adjusting the flow amount ratio in the second air passage.

4. The air conditioner according to claim 1, wherein:
   when the link mechanism is at the first maximum cooling position, an open degree of the hot water valve is set smaller than an open degree of the hot water valve when the one air mixing door connected to the link mechanism is at a position different the door maximum cooling position.

5. The air conditioner according to claim 1, wherein:
   when the one air mixing door connected to the link mechanism is at a position different the door maximum cooling position, the one air mixing door opens an air passage of the heating heat exchanger.

6. The air conditioner according to claim 1, wherein:
   the air passages include a first air passage through which air flows toward a first zone in the passenger compartment and a second air passage through which air flows toward a second zone different from the first zone in the passenger compartment;
   the air mixing doors include a first door for adjusting temperature of air blown toward the first zone from the first air passage by adjusting the flow amount ratio in the first air passage, and a second door for adjusting temperature of air blown toward the second zone from the second air passage by adjusting the flow amount ratio in the second air passage.

* * * * *